Patented May 18, 1943

2,319,576

UNITED STATES PATENT OFFICE 2,319,576

PEROXIDIZED ESTER

Maynard C. Agens, Schenectady, N. Y., assignor to General Electric Company, a corporation of New York No Drawing. Application March 27, 1940, Serial No. 326,271

6 Claims. (Cl. 260—345)

This invention relates broadly to peroxidized esters and to compositions comprising the same. More particularly the invention is concerned with the production and utilization of a peroxidized ester of a polycarboxylic acid, e. g., succinic, maleic, phthalic, tricarballylic, etc., and and an alcohol-ether, e. g., tetrahydrofurfuryl alcohol,

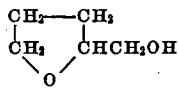

ethylene glycol monoethyl ether, diethylene glycol monophenyl ether, etc. These peroxidized esters are especially suitable for use as polymerization catalysts. The scope of the invention includes compositions of matter comprising a polymerizable organic compound containing a

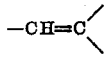

grouping, specifically a

grouping, and a peroxidized ester of a polycarboxylic acid wherein the hydrogen of at least one carboxyl group has been replaced by the radical of an alcohol-ether.

It has been the general practice heretofore in the preparation of polymeric materials from polymerizable organic compounds containing a

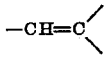

grouping to effect polymerization with the aid of a polymerization catalyst, accompanied by heat, light or heat and light. Various catalysts have been employed or suggested for this purpose, for instance inorganic super-oxides such as barium, peroxide, sodium peroxide, etc., dialkyl peroxides such as lauryl peroxide, stearyl peroxide, etc., symmetrical diacyl peroxides, e. g., acetyl peroxide, lauroyl peroxide, stearoyl peroxide, benzoyl peroxide, etc., unsymmetrical or mixed diacyl peroxides, e. g., acetyl benzoyl peroxide, etc. Illustrative examples of other known accelerators of polymerization of polymerizable compounds containing a

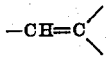

grouping are given in copending Nordlander application Serial No. 302,166, filed October 31, 1939, and assigned to the same assignee as the present invention. Benzoyl peroxide has been the catalyst heretofore most commonly used in polymerizing compounds containing a

grouping.

There long has been need, particularly in the plastics and coating arts, for a relatively inexpensive, readily producible, efficient catalyst for polymerizing polymerizable

-containing organic compounds. Such catalyst should be readily soluble or dispersible in the material to be polymerized. There should be no explosion hazards in its manufacture or use. It should have good storage stability. It is particularly desirable to have a catalyst which is liquid or liquefiable, since thereby dissolving or dispersing the catalyst in the polymerizable material is facilitated. The properties of the catalyst also should be such that it can be heated, while admixed with the material to be polymerized, at the temperatures and for the periods of time required to effect polymerization of the polymerizable material without the formation of objectionable decomposition products, e. g., products that would discolor the polymerized material.

The present invention provides a polymerization catalyst meeting the above requirements. This new polymerization catalyst consists essentially of a peroxidized ester of a polycarboxylic acid containing at least two carbon atoms (preferably from three to eighteen carbon atoms, inclusive) wherein the hydrogen of at least one carboxyl group has been replaced by the radical of an alcohol-ether. The other carboxyl group or groups may be unesterified, especially when a less active polymerization catalyst is desired. Or, the hydrogen of such carboxyl group or groups may be replaced by the radical of an alcohol-ether which is the same as, or different from, the other alcohol-ether substituent grouping, or by the radical of any other esterifiable hydroxy compound. The essential point is that the hydrogen of at least one carboxyl group of the polycarboxylic acid must be replaced by the radical of an alcohol-ether. Optimum results are obtained when the hydrogens of all the carboxyl groups are replaced by the radicals of an alcohol-ether. Hence, in carrying the invention into effect I prefer to use a peroxidized alcohol-ether polyester (diester, triester, etc.) of a polycarboxylic acid.

The alcohol-ether esters of polycarboxylic acids are prepared in accordance with technique well known to those skilled in the art of preparing esters. For example, they may be prepared as described in my copending application Serial No. 326,272, filed concurrently herewith, with reference to the preparation of esterification products of a polyhydric alcohol, an alcohol-ether containing a single alcoholic hydroxyl group, and an alpha unsaturated alpha beta polycarboxylic acid.

In preparing the polymerization catalysts of this invention, I peroxidize an alcohol-ether ester of a polycarboxylic acid, for instance by heating such ester in contact with air or oxygen. Advantageously the ester is peroxidized by agitating it in air while simultaneously heating it at a suitable temperature, for example at 30° to 100° C. Either mechanical or air agitation may be employed. The ester also may be mechanically stirred while simultaneously passing a stream of air or oxygen into the mass. In some cases it may be desirable to peroxidize the ester in the absence of applied heat, for instance at room temperature (20° to 25° C.). In general, the lower the temperature of peroxidation, the longer the time required; and, conversely, the higher the temperature, the shorter the time.

The degree of peroxidation obtained by the abovedescribed treatment of the esters conveniently may be measured by the analytical method described by Liebhafsky and Sharkey in an article "The Determination of Organic Peroxides," appearing in the January, 1940, issue of the Journal of the American Chemical Society. This method involves the titration of iodine with a sodium thiosulfate solution. The degree of peroxidation is expressed as the "peroxide equivalent per gram of material." This is defined by Holde in Kohlenwasserstofföle und Fette, 7th edition, 1933, page 220, as the gram equivalent of active oxygen per gram of material. This may be better understood by a consideration of the following:

(1) ½ gram equivalent of active oxygen equals 1 gram equivalent of iodine;
(2) 1 liter N sodium thiosulfate solution equals 1 liter N iodine solution or 1 gram equivalent of iodine;
(3) 1 cc. N sodium thiosulfate solution equals $$\frac{1}{1000} \times \frac{1}{2}$$

gram equivalent of active oxygen;
(4) X number of cc. of Y-normal sodium thiosulfate solution equals $$\frac{X \times Y}{1000} \times \frac{1}{2}$$

gram equivalent of active oxygen;
(5) Then, if the weight of the sample be represented by W, $$\frac{X \times Y}{2000W}$$

equals gram equivalent of active oxygen per gram of material, that is, "peroxide equivalent per gram of material."

Illustrative of the rate of peroxidation are the following data obtained when peroxidizing di-(tetrahydrofurfuryl) maleate by rapidly stirring it in air while simultaneously heating it to a temperature of about 80° C.

| Time of peroxidation in hours | Peroxide equivalent per gram of material |
|---|---|
| 1 | $9.2 \times 10^{-6}$ |
| 3 | $12.4 \times 10^{-6}$ |
| 4.8 | $21.7 \times 10^{-6}$ |
| 7.8 | $35.9 \times 10^{-6}$ |
| 11.2 | $47.7 \times 10^{-6}$ |
| 13.8 | $101.8 \times 10^{-6}$ |

From a practical standpoint it is desirable that the peroxidized alcohol-ether esters of this invention have a peroxide equivalent per gram of material of at least $8 \times 10^{-6}$, preferably $80 \times 10^{-6}$ or more.

Catalysts of the peroxide type used for accelerating the polymerization of polymerizable

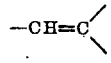

-containing compounds not only should be stable at normal temperature but furthermore should not undergo excessive thermal decomposition at the elevated temperatures at which the polymerization is to be carried out. The following data with reference to the peroxide content of peroxidized di-(tetrahydrofurfuryl) maleate when heated at temperatures materially above 80° C. for varying periods of time are illustrative of the action of the peroxidized alcohol-ether esters of this invention under heat:

|  | Peroxide equivalent per gram of material |
|---|---|
| Initial value | $101.8 \times 10^{-6}$ |
| After 2 hours' heating at 96–97° C. | $97 \times 10^{-6}$ |
| After 3 to 4 minutes more at 120° C. | $92.5 \times 10^{-6}$ |
| After 10 minutes more at 150–160° C. | $8.4 \times 10^{-6}$ |

The above data show that a peroxidized alcohol-ether ester of a polycarboxylic acid, specifically peroxidized di-(tetrahydrofurfuryl) maleate, is relatively stable at temperatures as high as 120° C. and that it only decomposes rapidly at temperatures of the order of 150° to 160° C. These characteristics, together with the fact that this alcohol-ether ester is a relatively non-volatile liquid which itself is polymerizable, make it especially adapted for the polymerization of polymerizable vinylidene compounds, vinyl compounds, acrylic and alkacrylic compounds, unsaturated alkyd resins, and other polymerizable organic compounds containing a

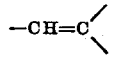

grouping.

The following examples are illustrative of the utilization of these peroxidized alcohol-ether esters as polymerization catalysts. All parts are by weight.

*Example 1*

| | Parts |
|---|---|
| Diethylene glycol maleate | 50 |
| Peroxidized di-(tetrahydrofurfuryl) succinate having a peroxide equivalent of $101.7 \times 10^{-6}$ | 50 | were mixed in a suitable receptacle, which then was placed in a 130° C. oven. When examined at the end of 15 minutes' heating, the mixture had polymerized to a solid condition. Diethylene glycol maleate alone, when heated at a temperature as high as 155° C., formed a skin upon the surface while the underlying portion was entirely fluid.

Example 2

| | Parts |
|---|---|
| Diallyl itaconate | 100 |
| Peroxidized di-(tetrahydrofurfuryl) maleate having a peroxide equivalent of $132.5 \times 10^{-6}$ | 50 | were mixed in a suitable container, which thereafter was placed in a 125° C. oven. After 30 minutes at this temperature the entire mass polymerized to solid state.

Example 3

| | Parts |
|---|---|
| Diallyl itaconate | 90 |
| Peroxidized di-(tetrahydrofurfuryl) maleate having a peroxide equivalent of $132.5 \times 10^{-6}$ | 10 | were mixed in a suitable receptacle, which then was placed in a 120° C. oven for 1 hour. At the end of this time the mixture had polymerized to a uniform gel. The strain at the meniscus was released by inserting a spatula around the glass-polymer interface. Additional heating at 120° C. for about 8 hours gave a clear, glass-hard polymeric body.

Example 4

| | Parts |
|---|---|
| Methyl methacrylate | 50 |
| Peroxidized di-(tetrahydrofurfuryl) succinate having a peroxide equivalent of $101.7 \times 10^{-6}$ | 50 | were mixed in a suitable container and placed in an 80° C. oil bath. At the end of 2½ hours this mixture had polymerized to a solid condition. A corresponding treatment of methyl methacrylate alone resulted in a very fluid material showing only very slight polymerization.

Example 5

| | Parts |
|---|---|
| Methyl methacrylate | 60 |
| Peroxidized di-(tetrahydrofurfuryl) maleate having a peroxide equivalent of $132.5 \times 10^{-6}$ | 40 | were mixed in a stoppered tube and placed in an 80° C. oil bath. In approximately 1 hour the mixture had polymerized to a solid state. Further heating for about 20 hours at this temperature yielded a flexible, tough compound.

Example 6

| | Parts |
|---|---|
| Styrene | 80 |
| Peroxidized di-(tetrahydrofurfuryl) maleate having a peroxide equivalent of $132.5 \times 10^{-6}$ | 20 | were mixed in a suitable container and heated in an 80° C. oil bath. The viscosity of this mixture slowly increased until at the end of 7 hours it no longer would flow. Additional heating for about 18 hours at this same temperature yielded a tough, transparent material. Similar treatment of styrene alone gave a material of very low viscosity at the end of 7 hours and a viscous syrup upon further heating. These comparative results show that the peroxidized ester catalyzed the polymerization of the styrene.

It will be understood, of course, that my invention is not limited to the particular peroxidized alcohol-ether esters named in the above illustrative examples. Thus, in the preparation of these esters I may use any alcohol-ether, that is to say, any monohydric alcohol-ether containing at least one ether (—C—O—C—) linkage. Mixtures of alcohol-ethers may be employed. Specific examples of alcohol-ethers containing a single alcoholic hydroxyl group and at least one ether linkage are glycol mono-alkyl ethers, e. g., ethylene glycol monomethyl ether, ethylene glycol monobutyl ether, diethylene glycol monoethyl ether, diethylene glycol monobutyl ether, etc.; also, glycol mono-aryl ethers, e. g., the monophenyl and monobenzyl ethers of ethylene glycol and diethylene glycol. Additional examples of other monohydric alcohol-ethers which may be used in preparing the alcohol-ether esters of this invention are given in my copending application Serial No. 326,272.

In preparing these alcohol-ether esters I may use any saturated or unsaturated polycarboxylic acid containing two or more carboxyl groups. Thus I may use saturated aliphatic polycarboxylic acids such, for example, as oxalic, malonic, succinic, glutaric, adipic, pimelic, suberic, azelaic, sebacic, tricarballylic, malic, tartaric, citric, etc.; unsaturated aliphatic polycarboxylic acids such, for instance, as maleic, fumaric, citraconic, mesaconic, itaconic, aconitic, etc.; the cyclic polycarboxylic acids, more specifically the saturated and unsaturated cyclo aliphatic polycarboxylic acids, e. g., the cyclopropane and cyclopropene dicarboxylic acids, the cyclohexane and cyclohexene dicarboxylic acids, the alkyl cycloalkane polycarboxylic acids, etc.; and the halogenated and non-halogenated aromatic polycarboxylic acids, e. g., halogenated and non-halogenated phthalic, isophthalic, terephthalic, benzoyl phthalic, diphenic, benzophenone-2,4'-dicarboxylic, etc., acids. Mixtures of different polycarboxylic acids may be used. If available, the anhydrides of polycarboxylic acids may be employed. The terms "polycarboxylic acids" and "dicarboxylic acids," as used generally herein and in the appended claims, therefore are intended to include within their meanings the anhydrides of the acids.

I prefer to use as polymerization catalysts peroxidized di-(alcohol-ether) esters of dicarboxylic acids, tri-(alcohol-ether) esters of tricarboxylic acids, etc., that is, peroxidized esters of polycarboxylic acids wherein all of the hydrogens of the carboxyl groups have been replaced by the radicals of the same or different alcohol-ethers. With such esters maximum peroxidation per unit weight of material can be obtained. However, in cases where high peroxide content of the ester is of secondary consideration, then I may prepare esters containing the groupings (COOR)$_x$ and (COOR')$_y$, where R is the radical of an alcohol-ether, R' is a member of the class consisting of hydrogen and radicals of esterifiable hydroxyl compounds other than alcohol-ethers, and $x$ and $y$ are positive numbers the sum of which is at least 2. When such mono-esters or mixed esters are prepared from a polycarboxylic acid containing at least three carbon atoms, they may be represented by the formula

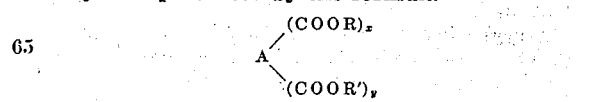

where A is a polyvalent hydrocarbon radical having at least one carbon atom, R and R' have the meanings given in the preceding sentence, $x$ is a positive number, $y$ is a positive number, the sum of $x$ and $y$ being equal to the valence of A. These mono-esters and mixed esters may be peroxidized as above described.

Illustrative of esterifiable hydroxyl compounds the radicals of which may constitute R' in the above formulas are the saturated and unsaturated, aliphatic, straight-chain and branched-chain alcohols, e. g., ethyl, propyl, isopropyl, isobutyl, secondary butyl, tertiary butyl, tertiary amyl, allyl, methallyl, propallyl, etc., alcohols; ethylene glycol mono-esters, e. g., ethylene glycol monoacetate, ethylene glycol monopropionate, ethylene glycol monobenzoate, ethylene glycol monocrotonate, etc.; alcohols containing substituent groups, e. g., 1-chlorallyl alcohol, 2-chlorallyl alcohol, etc.; polyhydric alcohols free from ether linkages, e. g., ethylene glycol, propylene glycol, trimethylene glycol, glycerol, pentaerythritol, etc.; the esterifiable carbocyclic organic compounds, e. g., benzyl alcohol, cinnamyl alcohol, cyclopentanol, cyclohexanol, etc. Other examples of esterifiable hydroxyl compounds which may be used in preparing the mixed esters appear, for instance, in copending D'Alelio application Serial No. 313,103, filed January 9, 1940, and in other copending applications referred to in that application, all of which applications are assigned to the same assignee as the present invention.

The poly-(alcohol-ether) esters of polycarboxylic acids that, when peroxidized, form the preferred polymerization catalysts may be represented by the formula A—(COOR)$_x$, where A is a polyvalent hydrocarbon radical having at least one carbon atom, R is the radical of an alcohol-ether, $x$ is at least 2, the value of $x$ being equal to the valence of A.

The peroxidized alcohol-ether esters of this invention may be used as accelerators of polymerization of polymerizable organic compounds containing a

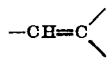

grouping, illustrative examples of which are esters containing ethylenic or acetylenic unsaturation in either the alcohol radical or the acid radical, or in both, for instance saturated and unsaturated alcohol esters of unsaturated monocarboxylic and polycarboxylic acids, unsaturated alcohol esters of non-ethylenic polycarboxylic acids, unsaturated alcohol esters of saturated monocarboxylic acids, etc. Examples of

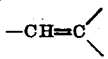

-containing compounds with which these new esters may be copolymerized to yield new compositions of particular utility in the plastics and coating arts are vinyl cyclic compounds, e. g., styrene, methyl styrene, para chloro styrene, divinyl benzene, vinyl naphthalene, vinyl furane, etc.; unsaturated ethers, e. g., ethyl vinyl ether, methallyl propyl ether, etc.; unsaturated ketones, e. g., methyl vinyl ketone, divinyl ketone, methyl allyl ketone, etc.; itaconic esters, e. g., dialkyl itaconates, diaryl itaconates, etc.; acrylic and alkacrylic compounds, e. g., acrylic nitrile, methacrylic nitrile, esters of esterifiable acrylic compounds, for instance methyl, ethyl, propyl, butyl, etc. acrylates and alkacrylates, more specific examples of which latter are methyl methacrylate, methyl ethacrylate, ethyl methacrylate, ethyl ethacrylate, etc.

Additional examples of organic compounds containing a

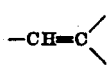

grouping which may be employed, separately or mixed, in forming these new interpolymerization products, are given in the copending applications of Nordlander and Margrave Serial No. 302,164, filed October 31, 1939, Nordlander Serial Nos. 302,165 and 302,166, also filed October 31, 1939, D'Alelio Serial No. 313,103, filed January 9, 1940, and in the other copending applications referred to in the said D'Alelio application. All of these copending applications are assigned to the same assignee as the present invention.

From the foregoing description it will be seen that this invention provides a method of preparing a new polymerization catalyst, which method comprises peroxidizing an ester of a polycarboxylic acid wherein the hydrogen of at least one carboxyl group has been replaced by the radical of an alcohol-ether. The alcohol-ether commonly known in the trade as tetrahydrofurfuryl alcohol, but which more properly may be termed a heterocyclic alcohol-ether, yields particularly effective peroxidized esters and therefore is the preferred alcohol-ether reactant.

The invention also provides a method of polymerizing a polymerizable organic compound containing a

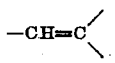

grouping, specifically a

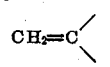

grouping, which comprises effecting polymerization of such compound while admixed with a polymerization catalyst comprising essentially a peroxidized alcohol-ether ester of a polycarboxylic acid. Polymerization may be effected at room temperature (20° to 25° C.) or at elevated temperatures, but generally is carried out within the temperature range of 60° to 130° C.

The amount of catalyst will vary widely, depending upon the peroxide content of the particular peroxidized ester and the polymerization characteristics of the particular material to be polymerized. Ordinarily, the amount of peroxidized ester is within the range of 0.1 to 25%, occasionally as high as 50%, by weight of the whole. The higher amounts conveniently may be employed when using a peroxidized ester of an alpha unsaturated alpha beta polycarboxylic acid, for example maleic acid or anhydride, since such esters are polymerizable alone to solid or semi-solid state.

Although I prefer to use these new peroxidized esters in combination with polymerizable

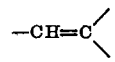

-containing compounds thereby to accelerate the polymerization of the latter, their field of utility is not limited thereto. Thus, they may be used, for example, as modifying agents of various substances commonly employed in the plastics and coating arts, for instance, air-drying and baking coating compositions such as varnishes, enamels, primers, etc., natural and synthetic resins, cellulose derivatives such as the esters and ethers, e. g., cellulose nitrate, cellulose acetate, propionate, butyrate, etc., methyl cellulose, ethyl cellulose, benzyl cellulose, etc., and for many other purposes.

What I claim as new and desire to secure by Letters Patent of the United States is:

1. A composition comprising a peroxidized ester of a polycarboxylic acid and an alcohol-ether containing a single alcoholic hydroxyl group and at least one ether linkage, said ester having a peroxide equivalent per gram of material of not less than $80 \times 10^{-6}$.

2. A composition comprising a peroxidized ester of a polycarboxylic acid and tetrahydrofurfuryl alcohol, said ester having a peroxide equivalent per gram of material of not less than $80 \times 10^{-6}$.

3. A composition comprising a peroxidized ester of a polycarboxylic acid and a mono-alkyl ether of a glycol, said ester having a peroxide equivalent per gram of material of not less than $80 \times 10^{-6}$.

4. Peroxidized tetrahydrofurfuryl maleate having a peroxide equivalent per gram of material of not less than $80 \times 10^{-6}$.

5. Peroxidized di-(tetrahydrofurfuryl) maleate having a peroxide equivalent per gram of material of not less than $80 \times 10^{-6}$.

6. Peroxidized di-(tetrahydrofurfuryl) succinate having a peroxide equivalent per gram of material of not less than $80 \times 10^{-6}$.

MAYNARD C. AGENS.